United States Patent

Goren et al.

[11] Patent Number: 5,428,752
[45] Date of Patent: Jun. 27, 1995

[54] PROCESSOR SYSTEM OPTION MODULE IDENTIFICATION SYSTEM

[75] Inventors: Oz Goren, Oranit; Nissim Fnounou, Bat-Yam, both of Israel

[73] Assignee: Motorola, Inc., Schaumburg, Ill.

[21] Appl. No.: 925,707

[22] Filed: Aug. 4, 1992

[30] Foreign Application Priority Data

Sep. 28, 1991 [GB] United Kingdom ............. 9120669

[51] Int. Cl.$^6$ ............................................. G06F 13/00
[52] U.S. Cl. ............................... 395/325; 395/275; 364/241; 364/264.6; 364/281.9; 364/DIG. 1
[58] Field of Search ............... 395/325, 275, 725; 371/11.1, 11.3; 364/241, 281.9, 264.6, DIG. 1, 940.4, DIG. 2; 340/825.08

[56] References Cited

U.S. PATENT DOCUMENTS

| | | | |
|---|---|---|---|
| 4,562,535 | 12/1985 | Vincent et al. | 395/325 |
| 4,589,063 | 5/1986 | Shah et al. | 35/275 |
| 4,760,553 | 7/1988 | Buckley et al. | 395/575 |
| 4,825,404 | 4/1989 | Theus | 395/325 |
| 5,014,193 | 5/1991 | Garner et al. | 395/275 |
| 5,109,484 | 4/1992 | Hughes et al. | 395/200 |
| 5,204,669 | 4/1993 | Dorfe et al. | 340/825.52 |
| 5,274,767 | 12/1993 | Maskovyak | 395/275 |
| 5,274,771 | 12/1993 | Hamilton et al. | 395/275 |

Primary Examiner—Jack B. Harvey
Assistant Examiner—Glenn A. Auve
Attorney, Agent, or Firm—John M. England

[57] ABSTRACT

A processor system comprising a control module (10) and a variety of subsidiary modules or boards (11, 12, 13) connected to the control module by way of a bus and an analog connector line. The control module comprises an analog-to-digital input (16) for receiving a signal on the analog connector line (25) and each of the subsidiary modules comprising an analog element (24, 28, 29) and switch (23, 32, 33) connected for selectively switching the analog element to provide an analog signal on the analog connector line in response to a control signal received from the control module, thereby to identify the presence and/or type of the option board(s) installed in the system.

2 Claims, 1 Drawing Sheet

PROCESSOR SYSTEM OPTION MODULE IDENTIFICATION SYSTEM

BACKGROUND OF THE INVENTION

This invention relates to the identification of modules (e.g. boards) and their existence in a modular processor system, such as for use in a communications system.

1. Summary of the Prior Art

Many types of electrical equipment exist which comprise a main board and a number of "option"boards, i.e. functional add-on boards added by the user in a "pick and choose" manner to suit his application. Examples are the VMEbus microprocessor system. There is a need to identify automatically boards, for example printed circuit boards, modules and the like that are installed in the system and there is a need for the main unit to "learn" the system configuration.

In the field of battery chargers, it is known to incorporate a resistor in the battery and for the battery charger to read the value of the resistor to determine the type of battery and therefore the charging parameters required. Such an arrangement is shown in EP-A-0394074. Only one battery is connected to the charger at any one time.

2. Summary of the Invention

According to the invention there is provided a processor system comprising a control module and a variety of subsidiary modules connected to the control module by means of a bus and an analog connector line. The control module comprises an analog-to-digital input for receiving a signal on the analog connector line and each of the subsidiary modules comprises an analog element and switch means connected for selectively switching the analog element to provide an analog signal on the analog connector line in response to a control signal received from the control module.

The invention provides the advantage that a control signal provided to a subsidiary module from the control module activates the switchable means, so causing a change in the level on the analog connector line, thus indicating to the control module the presence of the subsidiary module.

It is preferred that a number of subsidiary modules have different functions and each has an analog element representative of its function, whereby subsidiary modules with the same or similar functions have the same analog element.

The analog element may be a resistance which, when switched causes a change in the voltage level on the analog connector line, the change being dependent on the value of the resistor, which is in turn indicative of the function of the subsidiary module.

A preferred embodiment of the invention will now be described by way of example only, with reference to the drawing.

DETAILED DESCRIPTION OF THE DRAWING

Figure 1:
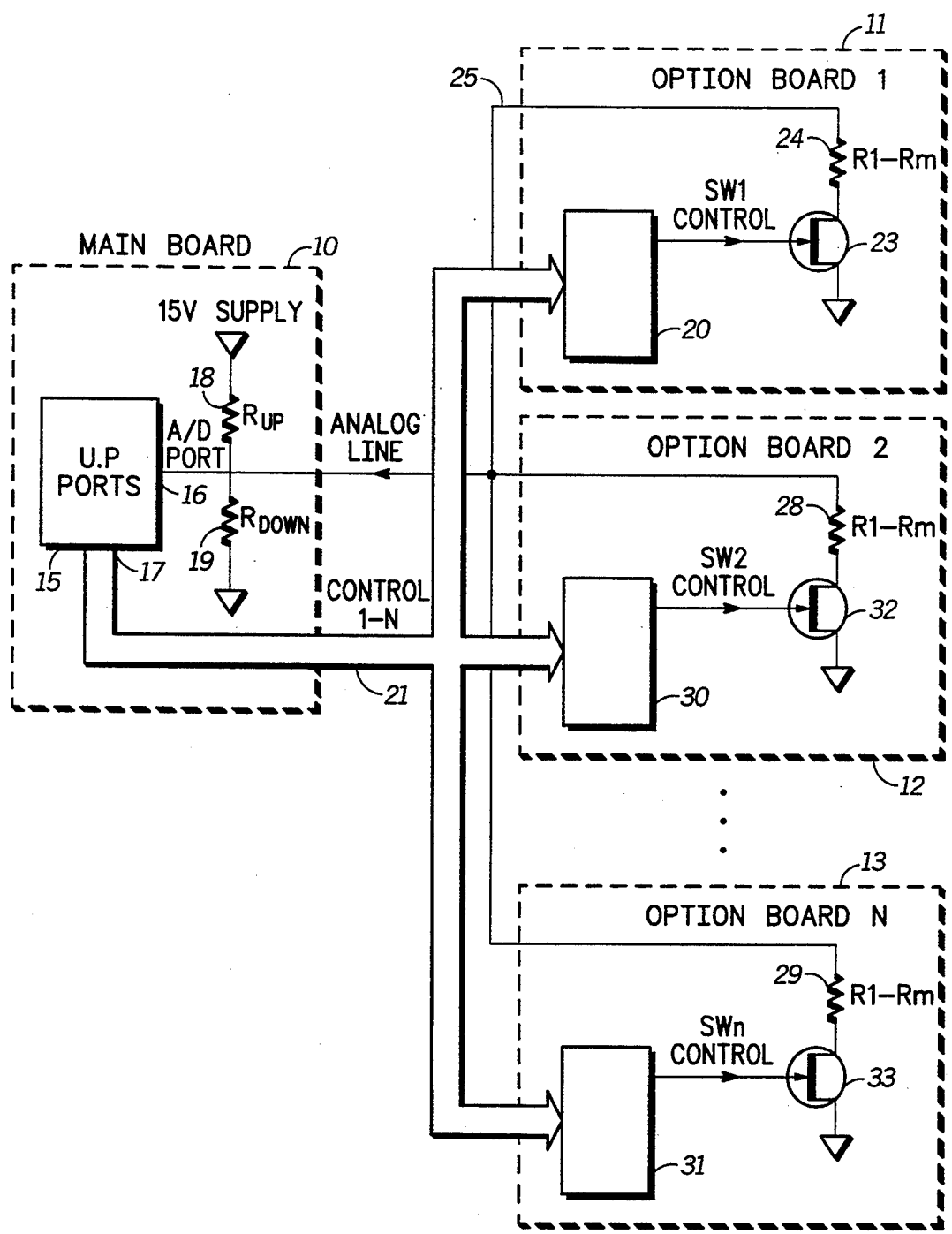
FIG. 1 is a circuit diagram showing a processor system incorporating the invention in its preferred embodiment.

FIG. 1 shows a processor system comprising a main control board 10 and three option boards 11, 12 and 13 under the control of the main control board 10 in a slave configuration. Although only three option boards are shown, there may be a large number of these boards. On the figure, they are numbered option board 1 to option board n.

The main board comprises a microprocessor port 15 which forms part of a control processor (not shown). The port 15 has an analog input 16 and a control bus output 17. Other inputs and outputs may be provided, but need not be considered here. Connected to the analog input 16 is a pull-up resistor 18 and a pull-down resistor 19. Typical values for these resistors are 100 Kohms and 51 Kohms respectively. Resistor 18 is connected to a sourve of 15 v DC supply. The analog input 16 is connected to an analog-to-digital converter in the port 15. This provides a digital representation of the voltage at the input 16 and this digital representation is passed to the microprocessor. The option board 11 comprises functional circuitry which is not shown, which performs the selected function of the board, for example expansion memory, input and output devices etc. The option board 11 has a serial-to-parallel port 20, which is connected for receipt of a control signal from bus output 17 of main control board 10 via a bus 21. Connected to one of the parallel outputs 22 of the serial-to-parallel port 20 is a junction field effect transistor 23 connected to a resistor 24. The JFET 23 switchably connects the resistor 24 to ground. The end of the resistor 24 remote from the JFET 23 is connected to an analog line connector 25 which is connected to the analog input 16 of the port 15 of the main control board 10.

Each of the option boards 12 and 13 has a serial-to-parallel port, a JFET and a resistor in the same manner and arrangement as option board 11. These elements are numbered 20–23 on the figure.

Each option board is physically and electrically mounted in a board connector (not shown).

The main control board 10 controls the switches on the option boards by the serial bus 21 to the option boards comprising a clock line, a data line and one latch line for each board connector. The serial-to-parallel ports 20, 30 and 31 on the option boards are shift registers which convert this serial data to eight parallel output controls for internal use on the option board. One of the controls is dedicated to the switch for option identification.

The example will be considered where the system is a console for digital remote control of a communications base station. In the example, option board 11 will be considered to be an expansion memory, option board 12 another expansion memory and option board 13 a modem board.

The value of resistor 24 of option board 11 is 10 Kohms and the value of resistor 28 of option board 12 is the same, because that board has the same function. The value of resistor 29 of option board 13 is 5 Kohms.

The operation of the equipment is as follows. In order for the main control board 10 to ascertain the function of a board connected to it, for example on power-up or upon reconfiguration of the system, the main board 10 sends a control word to the board connector of that board on the control bus 21. By means of the latch line to the board connector, the main control board effectively addresses one of the option boards 11, 12 and 13. The serial-to-parallel port 20 of the option board 11 receives this control word and a control signal is output from a pin on the port 20 to the base of the JFET 23.

The control signal on the base of the transistor 23 causes the resistor 24 to be connected to ground, thereby pulling down the voltage level on the analog line 25 to 1.16 v. The resulting change in voltage level is measured at the A/D port and passed to the microprocessor, which interprets this, for example by look-up table, and thereby ascertains that an expansion memory board is connected to the bus 21 and indeed determines that it is connected at a particular position.

Similarly, the main control board sends the control word to each of the other board connectors in turn by means of the respective latch lines and serial-to-parallel ports of the other option boards decode the control word. If the word is addressed to option board 11, neither option board 12 or option board 13 provides any control signal to the base of the respective transistor. In other words, the ports are configured such that only one option board serial-to-parallel port provides the necessary signal.

Accordingly if the port 15 sends a control signal to the option board connector of option board 12, a change in the voltage on analog connector line 25 is measured. This change will be the same, because the resistor 28 has the same value as resistor 24.

By contrast, if the port 15 sends a signal to the connector of option board 13, a different voltage will result on A/D port 16. This voltage will be 0.653 v and the microprocessor will interpret this as meaning that a modem is connected at the connector of option board 13.

If the voltage on the analog connector line 25 is high in response to a particular signal, this indicates that there is no board at all connected to that option board connector.

The arrangement described provides automatic option board identification with option board (status) down-load from the option to the main board. No extra components are required on the main board to implement the option identification. Only one resistor and one transistor are added to every option board and only one additional pin is added to the option connector to route the A/D port.

The option board resistors can be in the 2–100 Kohms range, at 2 Kohms resolution. The processor 15 performs a scaling of the range by first measuring the supply voltage (by disconnecting all option board switches). The microprocessor connects one of the option boards and measures the change in the analog line voltage. The arrangement has the advantage of being able to measure the supply voltage when all switches are disconnected. Thus:

$$V_{supply} = A/D\ voltage * (100+51)/51$$

In one embodiment of the invention, the microprocessor 15 identifies the option board type according to the voltage it is reading. The location of the various option boards on the main board is not important in this embodiment. In this embodiment, all option boards preferably have different resistors.

In an alternative embodiment of the invention, there is a specific location for each option board and the microprocessor identifies (a) whether the option board exists in its specific location (by a specific switch closure) and (b) if the option board is installed, what version of board it is according to the voltage on the analog line. In this embodiment, all option boards may have the same resistor.

We claim:
1. A processor system comprising:
at least one control module;
a plurality of modules subsidiary to said at least one control module;
a bus operatively connecting said at least one control module to said plurality of modules:
an analog connector line operatively connecting each of said plurality of modules to said at least one control module;
said at least one control module comprising at least one analog to digital input for receiving a signal on said analog connector line; and
each of said plurality of modules comprising at least one analog element and switch means operatively connected to each other for selectively switching each said at least one analog element to provide an analog signal on said analog connector line when a control signal is received by at least one of said plurality of modules from said control module, wherein the control module comprises look-up means for correlating said analog signals with module functions and for identifying the function of a module when an analog signal is received therefrom.

2. A processor system comprising:
at least one control module;
a plurality of modules subsidiary to said at least one control module;
a bus operatively connecting said at least one control module to said plurality of modules;
an analog connector line operatively connecting each of said plurality of modules to said at least one control module;
said at least one control module comprising at least one analog to digital input for receiving a signal on said analog connector line; and
each of said plurality of modules comprising at least one analog element and switch means operatively connected to each other for selectively each said at least one analog element to provide an analog signal on said analog connector line when a control signal is received by at least one of said plurality of modules from said control module, wherein a control line is provided to each said subsidiary module for directing the control signal to selected ones of said plurality of modules.

* * * * *